(12) United States Patent
Fonti et al.

(10) Patent No.: US 10,708,708 B2
(45) Date of Patent: Jul. 7, 2020

(54) REVERSE GEOCODING SYSTEM

(71) Applicant: Uber Technologies, Inc., San Francisco, CA (US)

(72) Inventors: Roberto Fonti, San Francisco, CA (US); Juthika Kiran Dabholkar, San Francisco, CA (US); Jeremy Hintz, Mountain View, CA (US); Kapil Gupta, Sunnyvale, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/161,838

(22) Filed: Oct. 16, 2018

(65) Prior Publication Data

US 2020/0120441 A1 Apr. 16, 2020

(51) Int. Cl.
*H04W 4/021* (2018.01)
*H04W 4/02* (2018.01)
*G06F 16/29* (2019.01)

(52) U.S. Cl.
CPC ............ *H04W 4/021* (2013.01); *G06F 16/29* (2019.01); *H04W 4/023* (2013.01); *H04W 4/025* (2013.01)

(58) Field of Classification Search
CPC .................................................... H04W 64/00
See application file for complete search history.

(56) References Cited

U.S. PATENT DOCUMENTS

| 9,551,586 | B2 | 1/2017 | Guo |
| 2013/0238234 | A1* | 9/2013 | Chao ................ G01C 21/206 701/409 |
| 2015/0012596 | A1* | 1/2015 | Redstone ............. H04L 67/18 709/204 |
| 2016/0216117 | A9 | 7/2016 | Bandyopadhyay et al. |
| 2016/0349059 | A1* | 12/2016 | McGuire ............. G01C 21/32 |
| 2017/0089715 | A1 | 3/2017 | Guo |
| 2018/0014161 | A1* | 1/2018 | Warren ............ G06F 16/24578 |

* cited by examiner

*Primary Examiner* — Rafael Pérez-Gutiérrez
*Assistant Examiner* — Frank E Donado
(74) *Attorney, Agent, or Firm* — Schwegman Lundberg & Woessner, P.A.

(57) ABSTRACT

Systems and methods are provided for receiving geographic coordinates for a location, generating a plurality of candidate places located within a predetermined distance from the location based on the geographic coordinates of the location, and extracting a plurality of features from each candidate place of the plurality of candidate places. The systems and methods are further provided for generating a place score for each candidate place of the plurality of candidate places using the plurality of features for each candidate place of the plurality of candidate places, determining the best candidate place based on the place score for each candidate place of the plurality of candidate places, and providing a place name associated with the best candidate place.

20 Claims, 8 Drawing Sheets

REVERSE GEOCODING SYSTEM

BACKGROUND

Reverse geocoding is the process of translating coordinates into a human readable string, which is typically a physical address of a location. For example, if given a particular latitude and longitude for a place, the latitude and longitude can be translated into an address, such as 123 Main Street. In many situations, however, the physical address alone may not be very useful. For example, a user may be using a ride service application and need to know where to meet the driver or other passengers for the ride. A user may not be familiar with the area or may not know a specific street or address and thus, simply providing an address alone may not be very helpful.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to reverse geocoding utilizing points of interests (POIs), among other data, to generate a more accurate and useful information for a given geographic coordinate. For example, reverse geocoding can be enhanced by taking into account POIs around a given geographic coordinate. A point of interest (POI) is a specific location that someone may find useful or interesting, such as a landmark (e.g., Golden Gate Bridge, Space Needle), a building (e.g., a particular apartment building, a specific business building), a venue (e.g., a stadium or concert arena), a business (e.g., a restaurant or coffee shop), a park or other outdoor venue, and so forth. In example embodiments, instead of simply providing an address for a particular location, a reverse geocoding system generates candidate places located within a predetermined distance from the location based on the geographic coordinates of the location for which reverse geocoding is desired. The system extracts features from each candidate place and generates a place score for each candidate place using the features. The system determines a best candidate place based on the place scores and provides the best candidate place, or information associated with the best candidate place (e.g., place name, generated string with place name and at least a portion of the address, or the like), to a requesting device.

Figure 1:
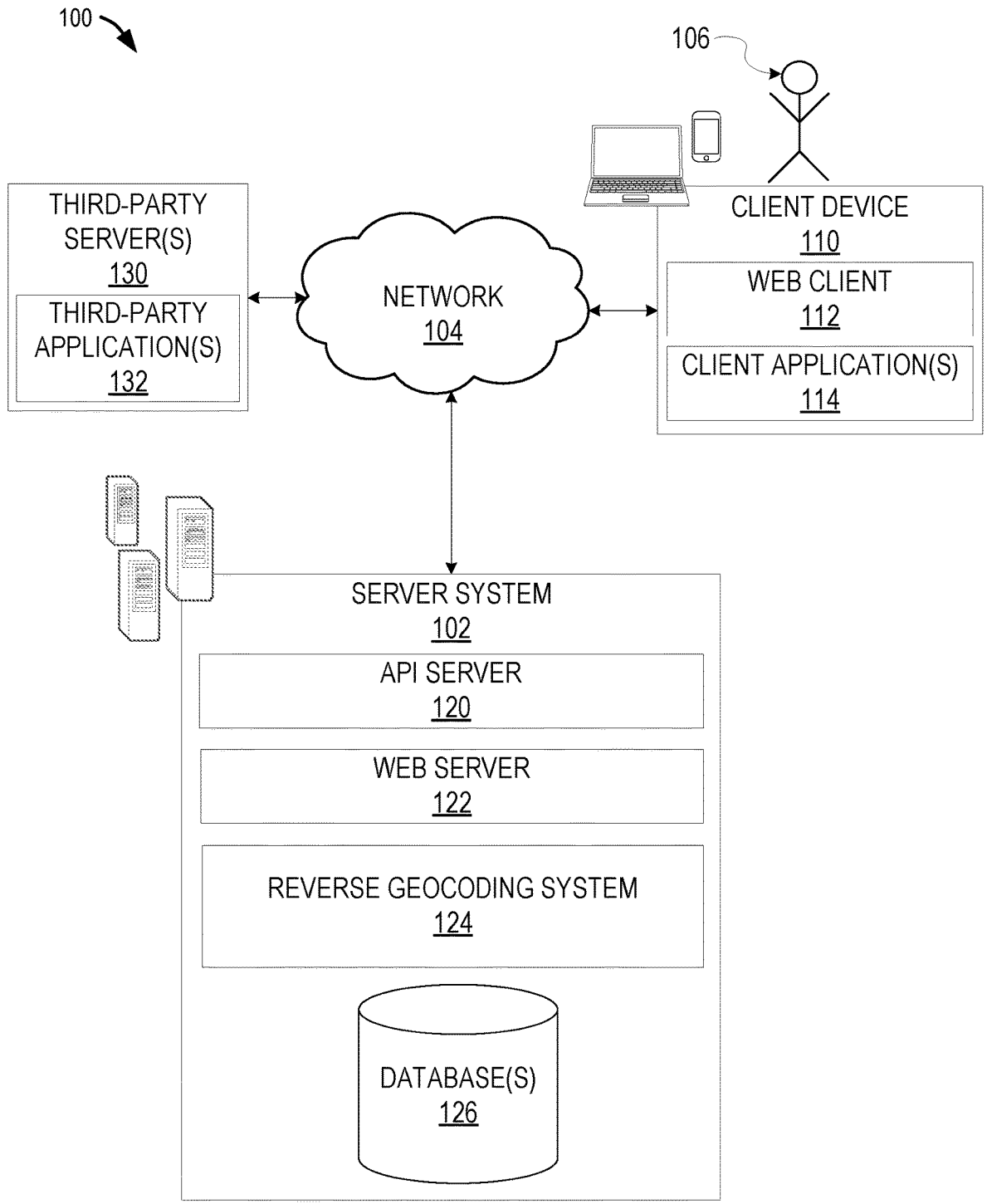
FIG. 1 is a block diagram illustrating a networked system configured to provide reverse geocoding using points of interest (POIs), according to some example embodiments.

FIG. 1 is a block diagram illustrating a networked system 100, according to some example embodiments, configured to utilize POIs in reverse geocoding. The system 100 includes one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to request map information, provide map information, request navigation information, receive and display results of map and/or navigation information, request data about a place or entity in a particular location, receive and display data about a place or entity in a particular location, and so forth.

One or more users 106 may be a person, a machine, or other means of interacting with the client device 110. In example embodiments, the user 106 may not be part of the system 100, but interacts with the system 100 via the client device 110 or other means. For instance, the user 106 may provide input (e.g., touch screen input or alphanumeric input) to the client device 110 and the input may be communicated to other entities in the system 100 (e.g., third-party servers 130, server system 102) via a network 104. In this instance, the other entities in the system 100, in response to receiving the input from the user 106, communicate information to the client device 110 via the network 104 to be presented to the user 106. In this way, the user 106 interacts with the various entities in the system 100 using the client device 110.

The system 100 further includes the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 accesses the various data and applications provided by other entities in the system 100 via a web client 112 (e.g., a browser, such as the Internet Explorer® browser developed by Microsoft® Corporation of Redmond, Wash. State) or one or more client applications 114. The client device 110 may include the one or more client applications 114 (also referred to as "apps") such as, but not limited to, a web browser, messaging application, electronic mail (email) application, an e-commerce site application, a mapping or location application, a ride-sharing application, and the like.

In some embodiments, the one or more client applications 114 may be included in the client device 110, and configured to locally provide a user interface and at least some of the functionalities, with the client application 114 configured to communicate with other entities in the system 100 (e.g., third-party servers 130, server system 102), on an as needed basis, for data and/or processing capabilities not locally available (e.g., access location information, to authenticate the user 106, to verify a method of payment, etc.). Conversely, the one or more applications 114 may not be included in the client device 110, and the client device 110 uses its web browser to access the one or more applications hosted on other entities in the system 100 (e.g., third-party servers 130, server system 102).

The server system 102 provides server-side functionality via the network 104 (e.g., the Internet or wide area network (WAN)) to one or more third-party servers 130 and/or one or more client devices 110. The server system 102 may include an application program interface (API) server 120, a web server 122, and a reverse geocoding system 124 that are communicatively coupled with one or more databases 126.

The one or more databases 126 are storage devices that store data related to one or more of source code, machine learning model training data, image data (including extracted text from images), place or other mapping data (e.g., addresses, points of interest), and so forth. The one or more databases 126 may further store information related to the third-party servers 130, third-party applications 132, the client device 110, the client applications 114, the user 106, and so forth. The one or more databases 126 may be cloud-based storage.

The server system 102 is a cloud computing environment, according to some example embodiments. The server system 102, and any servers associated with the server system 102, are associated with a cloud-based application, in one example embodiment.

The reverse geocoding system 124 provides back-end support for the third-party applications 132 and the client applications 114, which may include cloud-based applications. The reverse geocoding system 124 receives geolocation coordinates for a location, generates candidate places located near the location, extracts features from the candidate places, generates a place score for each candidate feature, determines a best candidate place based on the place score, and so forth as described in further detail below. The reverse geocoding system 124 comprises one or more servers or other computing devices or systems.

The system 100 further includes one or more third-party servers 130. The one or more third-party servers 130 comprise one or more third-party application(s) 132. The one or more third-party application(s) 132, executing on the third-party server(s) 130, interact with the server system 102 via a programmatic interface provided by the API server 120. For example, the one or more third-party applications 132 may request and utilize information from the server system 102 via the API server 120 to support one or more features or functions on a website hosted by a third-party or an application hosted by the third-party. The third-party website or third-party application 132, for example, provides mapping, location, ride-sharing, or other functionality that is supported by relevant functionality and data in the server system 102.

Figure 2:
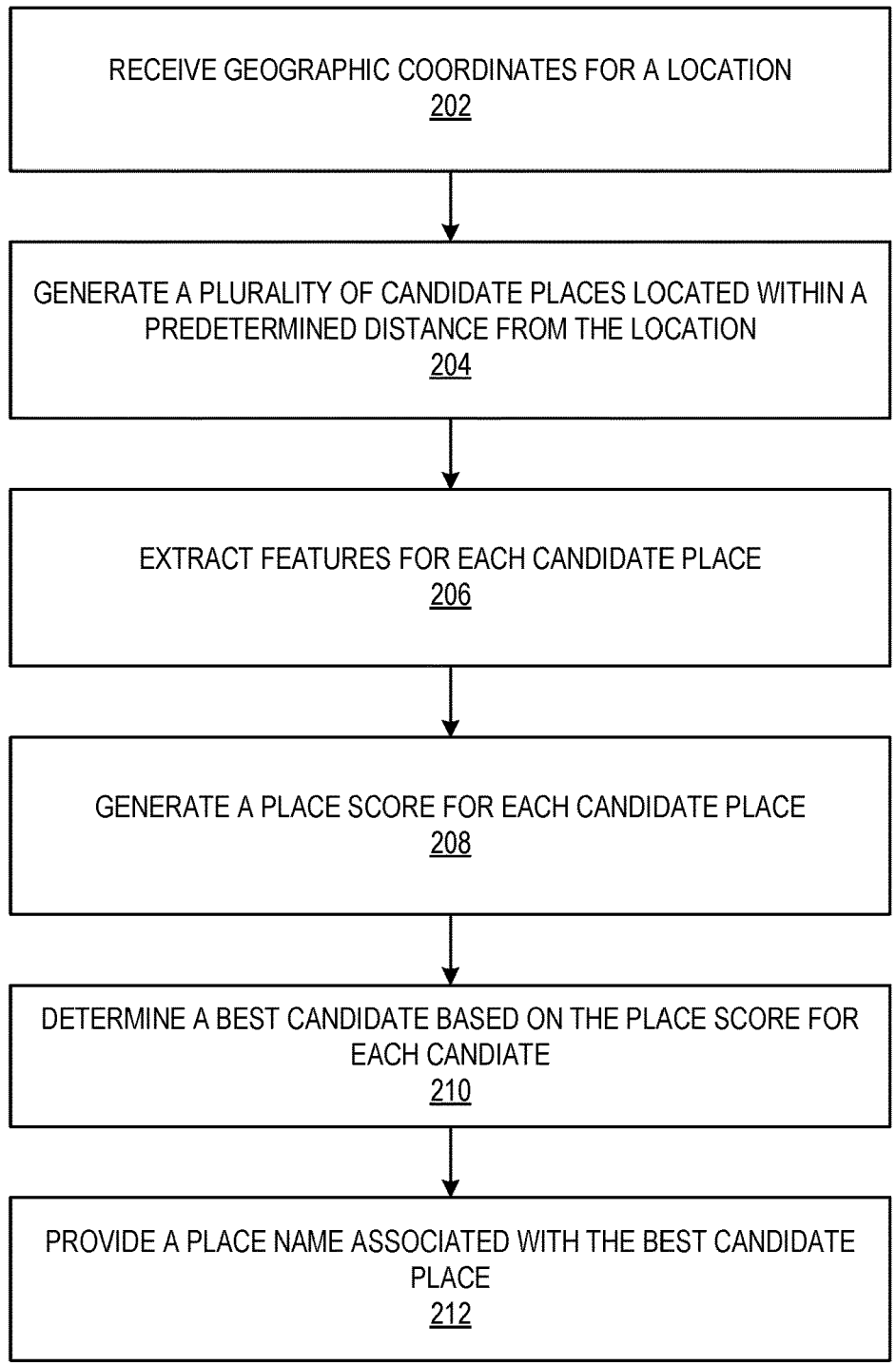
FIG. 2 is flowchart illustrating aspects of a method, according to some example embodiments.

FIG. 2 is a flow chart illustrating aspects of a method 200 for reverse geocoding utilizing POIs, according to some example embodiments. For illustrative purposes, the method 200 is described with respect to the networked system 100 of FIG. 1. It is to be understood that the method 200 may be practiced with other system configurations in other embodiments.

In operation 202, a server system (e.g., the server system 102 or the reverse geocoding system 124) receives geographic or geolocation coordinates for a location. In one example, the geographic coordinates comprise a latitude and longitude (e.g., 37.773972, −122.431297). In one example, the server system receives the geographic coordinates from a client device 110. For example, a user may be using a ride services application on his mobile device to request a ride to another location. When the user opens the ride services application or requests a ride, the client device 110 sends the geographic coordinates to the server system. The geographic coordinates may be determined using GPS or other technology of the client device 110. The geographic coordinates may be sent by the client device 110 as part of a request for reverse geocoding of the geographic coordinates or a request for a POI useful to display to the user on the client device 110 for meeting up with other riders or the driver for the ride.

Figure 3:
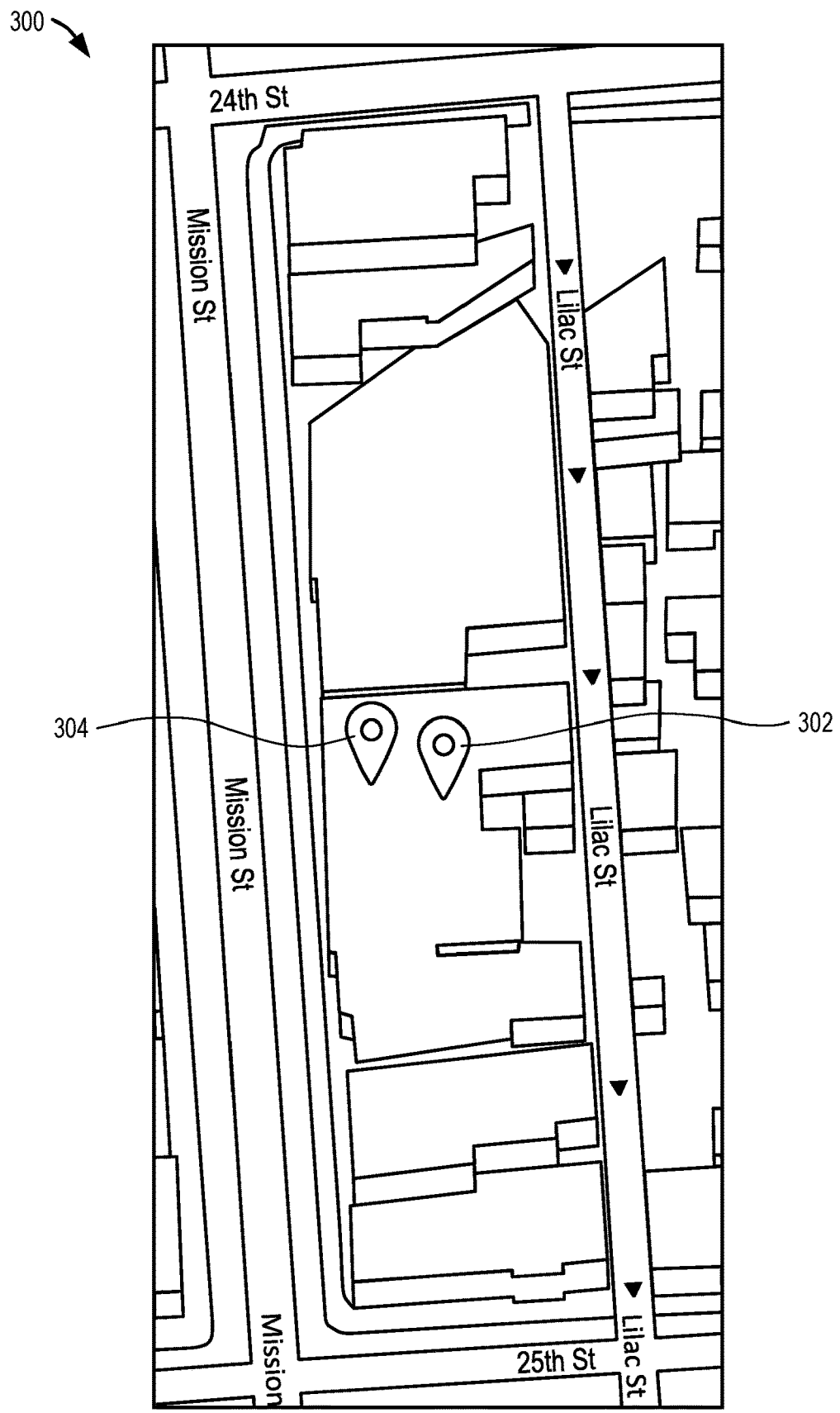
FIGS. 3-4 illustrate user interfaces, according to some example embodiments.

FIG. 3 is an example user interface 300 showing an indicator 302 on a map for a location, according to one example embodiment. In one example, this indicator 302 represents the location for which geographic coordinates are sent to the server system. In another example, a user may move the indicator to a different location, as shown by indicator 304. In this example, the client device 110 sends the geographic coordinates associated with indicator 304. The user interface is just one example of an application using geographic coordinates or mapping technology. Example embodiments may be used in other use cases where reverse geocoding is desired.

Figure 4:
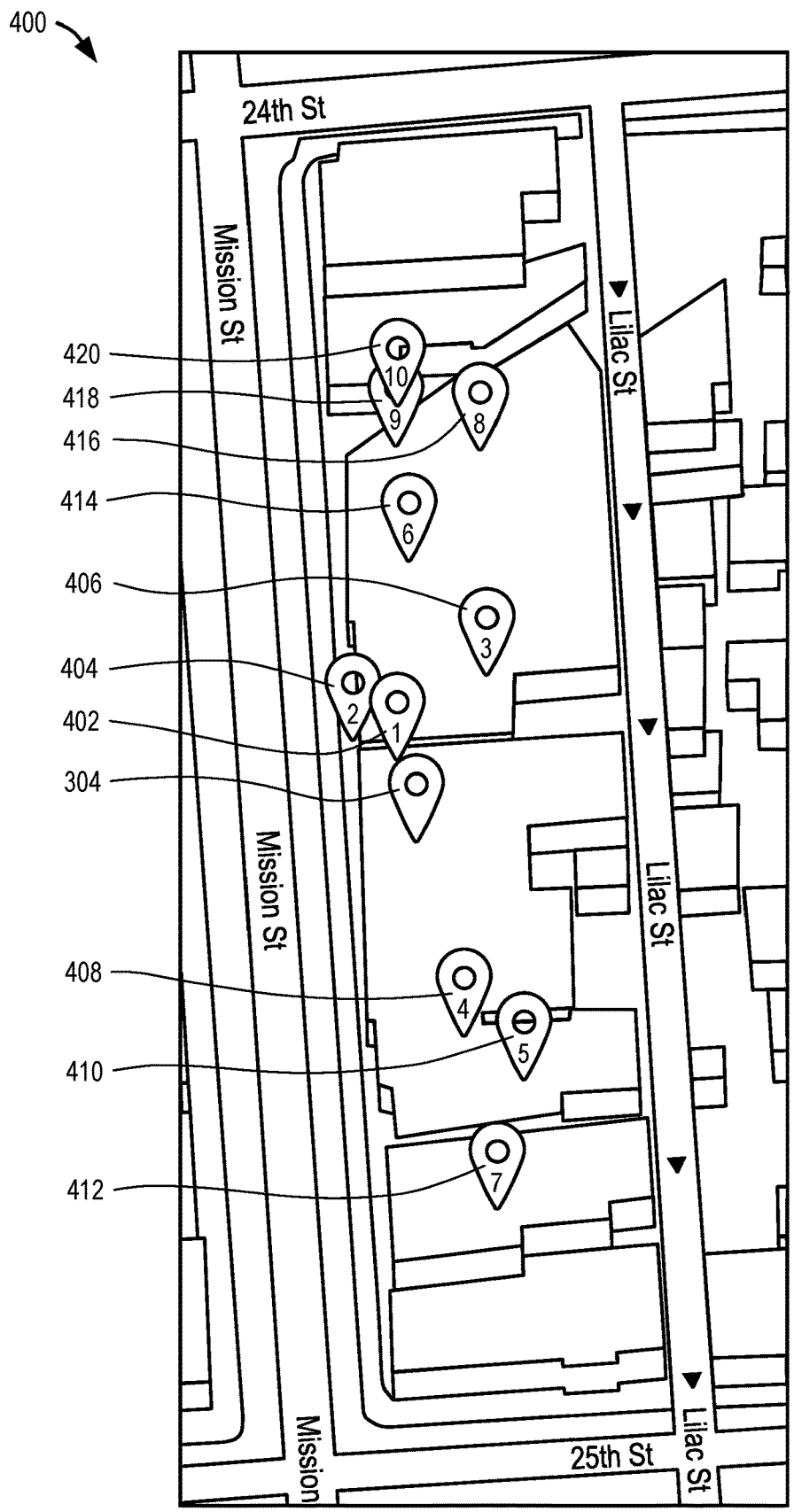

In operation 204, the server system generates a plurality of candidate places located within a predetermined distance (e.g., 100 meters, 500 feet, 0.55 miles, etc.) from the location (e.g., based on the geographic coordinates of the location). In one example, the server system may access one or more databases (e.g., database(s) 126, database(s) associated with third-party servers 130) that comprise a places data set that comprises addresses (e.g., 123 Main St.), cross streets (e.g., $11^{th}$ St. & Market St.), and POIs (e.g., Joe's Coffee on Market) for a given geographic area (e.g., city, state, country, world). The server system generates a query for any places (e.g., POIs, addresses, cross-streets) located within a predetermined distance from the location. In one example, the server system generates a spatial query to retrieve data for places located within a predetermined distance from the location. The places retrieved from the query make up the plurality of candidate places. FIG. 4 shows a visual example 400 of candidate places 402-420 within a predetermined distance from a location 304.

In operation 206, the server system generates or extracts features for each candidate place of the plurality of candidate places. There are a number of features that can be associated with a particular candidate place. One example feature is the distance between the candidate place and the location. For example, the distance between the candidate place and the location may be a value in meters, feet, miles, and so forth. The server system may calculate this feature by using the geographic coordinates of the location and the geographic coordinates or other location information (e.g., address) of the candidate place.

Another example feature is whether the candidate place has been verified. For example, some places may be curated by a human to manually verify a location and associated information for a place. In another example, a place may be verified by user data confirming a location of the place, a place name, and the like. Whether the candidate place has been verified may be indicated via a flag or other means in a record for the candidate place.

Another example feature is a popularity of the candidate place. The popularity of a place may be based on metrics indicating how many times users take a trip to or from the candidate place (e.g., as a destination for a ride service or as a general commute path), how many times the candidate place appears in a query, and/or other metrics. The popularity may be a score or other value indicating the popularity of the candidate place.

Another example feature is a visibility of the candidate place. For example, the server system may use image data (e.g., from cameras in vehicles, buildings, mobile devices) to determine whether or not a candidate place (e.g., building, sign, logo, of the candidate place) is visible from outside. In another example, the server system may use the image data to determine from what direction the candidate place is visible, whether the candidate is visible during the night and/or day, and so forth. The visibility of the candidate place may be a value indicating a strength of visibility (e.g., between 0 and 1) or that the candidate place is visible or not (e.g., 0 is not visible and 1 is visible).

Other example features include the fact that the candidate place and location are in the same parcel, the fact that the candidate place and location are in the same city bock, and the fact that the candidate place and location are in the same building. A parcel is an area of land typically identified in government records and can be identified in mapping and location data. A city block and building can also be determined from mapping and location data (e.g., determining a block based on street information, determining a building from building footprint data). For example, a value indicating whether the candidate place is in the same parcel, or building, or block could be a Boolean value, that is 0 (e.g., not in the building) or 1 (e.g., in the building). The server system may generate a value indicating whether the candidate place is in the same parcel (e.g., 0.1), same city block (e.g., 0.5), and same building (e.g., 0.8), or use the fact that the candidate place is in the same parcel, city block, and/or building to calculate further values to determine the strength of a candidate place.

Another example feature is a distance from a building or block or parcel edge that indicates how close the request is to the edge of the geometry that describes the building, parcel or block. In this case we are talking about the perpendicular distance. Also, distance from the building ingress/egress points may be another example feature.

Other example features include how many candidate places are nearby (e.g., within the predetermined distance from the location) and what type of candidate places are nearby. For example, the server system may determine how many candidate places are nearby based on the total number of candidate places, and use the total number of candidate places to determine that there are many candidate places very close to each other, equally distant, all visible, or that there is only one candidate place nearby, and so forth.

Other example features include an address to POI relationship and a venue to sub venue relationship. For example, a first candidate place may be an address 100 Main Street and a second candidate may be a Joe's Coffee Shop at 100 Main Street. The server system can determine that these two candidate places refer to the same place and combine the candidate places or discard the candidate place that just has an address since it is already captured by the POI candidate place, and so forth. A sub venue may be a place that is within another place (for example, a restaurant inside a department store). In this example, if one candidate place is a sub venue of another candidate place, the candidate places can be combined or the less favorable one discarded.

In one example, each candidate place is associated with a place type. One example of a place type is address, indicating the candidate place is an address string. Another example of a place type is cross street (e.g., Market St. and Jackson St.) indicating that the candidate place is a cross street (e.g., that may be a location point in the middle of an intersection). Another example of a place type is POI, indicating that the candidate place is a point of interest.

In one example, the server system filters out candidate places by discarding places that are not in the same block or parcel. For example, a candidate place may be discarded if the candidate place is not in the same parcel or block unless the candidate place is less than a predetermined distance (e.g., 10 meters) away and it is of type address or the candidate place is less than the predetermined distance away and it is of type POI and there are no other POIs within a second predetermined distance (e.g., 15 meters). In another example, a candidate place may be discarded if the candidate place is in the same block but not in the same parcel, unless the candidate place is less that a predetermined distance (e.g., 25 meters) from the location and it is of type address or if the candidate place is less that the predetermined distance from the location and it is of type POI and there are no other POIs within a second predetermined distance (e.g., 15 meters) from the location. In yet another example, a candidate place is discarded if the candidate place is in the same parcel, unless the candidate place is less than a predetermined distance (e.g., 50 meters) from the location and is of type address, or if the candidate place is less than the predetermined distance away and it is of type POI and there are no other POIs within a second predetermined distance (e.g., 15 meters) from the location.

In one example, a candidate place is discarded if the candidate place has not been verified.

In operation 208, the server system generates a place score for each candidate place of the plurality of candidate places using the plurality of features generated or extracted for each candidate place. In one example, the server system generates a place score for the remaining candidate places (e.g., a subset of the candidate places) after some have been discarded, as described above. In one example, the generated place score is a score between 0 and 1 indicating the strength of the candidate place. There are a number of different ways a place score may be generated.

In one example, a place score is generated simply based on a distance score (e.g., distance feature), which is the distance between the candidate place and the query location, as explained above. In this example, the place score is the distance value (e.g., 1.8 meters, 1.2 meters, 3 meters). Thus, in this example, each candidate place has distance value as its place score. Also, in this example, the candidate place with the lowest place score (e.g., distance value) is the best candidate since the candidate place with the lowest score is the closest to the location.

In another example, a place score is generated based on the distance feature and the visibility feature. For example, a distance score may be added to a visibility score. For instance, a visibility score may comprise one value if the place is visible from the outside (e.g., 0.8) and a second value if the place is not visible from the outside (e.g., 1.0). In another example, other factors of visibility may be used to determine a visibility score, such as visibility based on time of day (e.g., nighttime visibility or daytime visibility), visibility based on direction, and so forth. Thus, if a candidate place has a distance score of 1.2 meters and a visibility score of 0.8, the place score for the candidate place is 2.0. In this example, the candidate place with the lowest place score is the best candidate.

As can be seen, any number of features and values may be combined to generate a place score. For example, a place score can comprise a distance score, a visibility score, and a popularity score. The place score for a candidate may be generated by adding together all of these scores. Any combination of features and values may be used to generate a place score and determine a best candidate place.

In another example, visibility, popularity, whether the candidate place is in the same parcel/block/building, and so forth can be used (e.g., using one or more in combination) to favor candidate places, for example, that are in the same building over those only in the same block or parcel. For example, an adjusted distance score can be computed using visibility. One example of an adjusted distance is as follows:

adjustedDistance=distance*visibility; if place is of type address adjustedDistance=distance/2*visibility; if place is of type POI In this example, a place of type POI is favored over a place of type address. As explained above, a visibility score may be one value (e.g., 0.8) if the place is visible from the outside and a second value (e.g., 1.0) if the place is not visible from the outside, thus favoring more visible places over less visible places.

Continuing with this example, each candidate place (or each candidate place that has not been discarded) is given a score as follows:

placeScore=max_distance−adjustedDistance/max_distance;

or 0 (zero) if adjustedDistance is greater than max_distance. With max_distance=a predetermined distance (e.g., 500 meters).

The placeScore is then combined with a base score based on the fact that the place is in the same building, parcel, or block as the query location. In this way, places are favored that are in the same building first, then places in the same parcel, and finally places in the same block. Example calculations include the following:

finalScoreInBuilding=0.99+0.01*placeScore finalScoreInParcel=0.95+0.05*placeScore finalScoreInBlock=0.5+0.4736842105*placeScore In one example, a predetermined value (e.g., 0.001) is added to the score of POIs (e.g., candidate places with type POI) so that, if an address and a POI have the same score, the POI will be favored. Thus, in this example, the final place score for each candidate is the finalScoreInBuilding, finalScoreInParcel, or finalScoreInBlock with the predetermined value added if the candidate place type is POI.

In yet another example, a machine learning model can be trained to generate the place score. For example, a machine learning model can be trained on a dataset comprising place data and a variety of features. The features can include the features described above, a subset of those features, and/or additional features. The trained machine learning model can then be used to generate the place score. For example, the server system can input extracted features for candidate places and a label for each candidate (e.g., a positive label if the candidate place is confirmed and negative is the candidate place is overridden with another location) to train the machine learning model. At retrieval time, the features for the candidate place are input into the trained machine learning model to generate a place score for each candidate place. Some example technology that can be used as a machine learning model include logistic regression, gradient boosted decision trees, support vector machines, and so forth.

Figure 5:
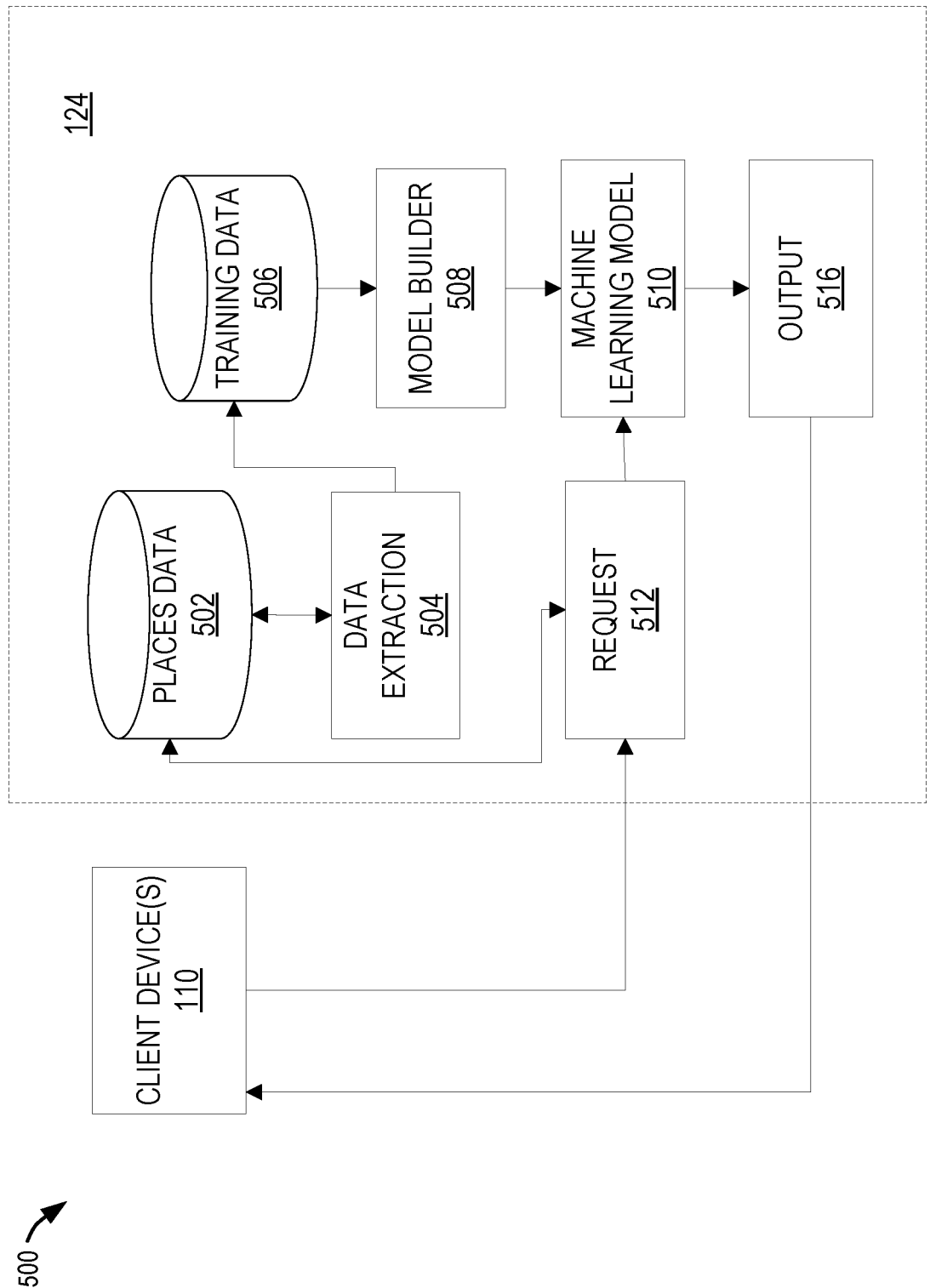
FIG. 5 is a block diagram illustrating a reverse geocoding system comprising a machine learning model trained to generate a place score, according to some example embodiments.

FIG. 5 is a block diagram 500 illustrating a reverse geocoding system 124 comprising a machine learning model trained to generate a place score, according to some example embodiments. A data extraction module 504 extracts data from places data 502 stored in one or more databases (e.g., database(s) 126) and stores the extracted data as training data 506 (e.g., in one or more database(s) 126). For example, the data extraction module 504 may extract positive examples and negative examples from the places data 502 to use as training data 506. The places data 502 may comprise a plurality of places and information associated with each of the plurality of places. For example, the places data 502 may comprise, for each place, a place name, a place address, geocoordinates for the place (e.g., latitude and longitude), one or more place categories (e.g., restaurant, bar, coffee shop, park, church), and so forth. One or more features may also be extracted for training data, as explained above.

In one example, the machine learning model takes manually curated examples of locations to reverse geocoded addresses and would learn how to best combine the features associated with the candidates. An example of input could be [input_lat, input_lng, selected_candidate].

In another example, the machine learning model take examples of locations (e.g., lat/lng) pairs mapped to ideal address or place results and would learn how to best combine the features associated with the candidates to yield the expected result as the top candidate. An example of input could be [candidate_distance_from_request, candidate_popularity, candidate_type, label] where label would be positive if the candidate matches the expected result, and negative if it does not.

The training data 506 is used by model builder 508 to learn a machine learning model 510. A client device requests data via a request module 512, which retrieves candidate places from the places data 502 and extracts features for the candidate places, as described above. The request module 512 inputs the candidate places, including the extracted features, into the machine learning model 510. The machine learning model 510 takes the input candidate places and outputs a place score for each candidate place into output module 516. The output module 516 returns a best candidate place to the client device 110, as explained in further detail below.

Returning to FIG. 2, in operation 208, the server system determines the best candidate place based on the place score for each candidate place of the plurality of candidate places. For example, the server system may determine the candidate place with the best place score (e.g., highest or lowest place score depending on how the place score is calculated) and select that candidate place as the best candidate place.

In operation 210, the server system provides information associated with the candidate place (e.g., string address, place name, etc.). For example, the server system may provide a place name (e.g., Joe's Café) associated with the candidate place, as shown in operation 212, to a client device 110 and the client device 110 may use the place name to display it to a user.

In another example, the server system provides the place geographic locations (e.g., lat, lng) and metadata (name, address, type, categories, etc). The client device 110 may decide to display the place name (e.g., Joe's Cafe) or place address or both (e.g., overlaid on top of a map or in a list with other locations). In another example, the client device 110 might also be provided with popular pickup locations for the chosen location (e.g., a list of geographic locations close to the original candidate recommended for pickup). The client device 110 might choose to display these pickup locations on a map and also to set one of them as a default pickup location.

In one example, a POI is labeled according to its position relative to the location. For example, a POI may be across the street from a location, around the corner form the location, inside a building of the location, and so forth. The label of the POI may be used to provide the candidate place information to a client device 110. For example, the server system may provide "across the street from Joe's café" or "inside Acme Bread Company" or "around the corner from the Shell gas station."

Figure 6:
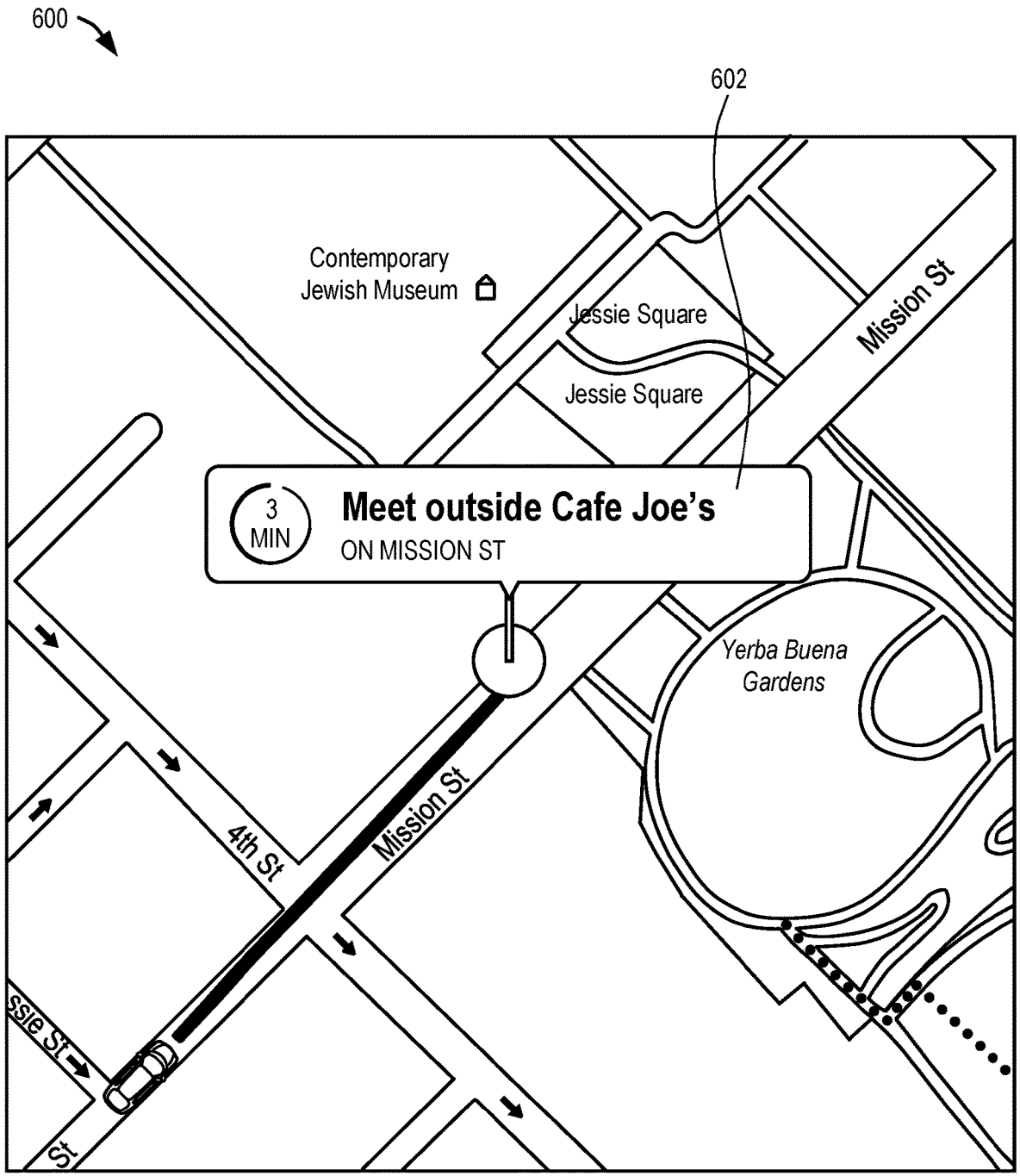
FIG. 6 illustrates an example user interface, according to some example embodiments.

The client device 110 can then display the information to a user. One example of a display of the information is shown in the example display 600 in FIG. 6. In this example, instead of an address (e.g., 123 Mission St) the display 600 shows the user a message 602: "Meet outside Cafe Joe's on Mission Street," which makes for a more user-friendly way to indicate a location.

In one example, the server system simply sends the information associated with the best candidate place to the client device 110, and the client device 110 (or other system, such as third-party servers 13) determines what to display and how to display it. The information associated with the best candidate may comprise one or more of the following: a place name, a place address, a place category (e.g., restaurant, café, coffee shop, drug store, gas station, park, etc.), a label indicating a position of a POI relative to the location (e.g., outside, inside, across the street, around the corner), and so forth. In another example, the server system compiles the information into a format to be displayed (e.g., "outside Café Joe's" or "across the street from Target") and sends the compiled information to the client device 110, and the client device can then display the compiled information. The server system may also send additional information (e.g., address, etc.) with the compiled information.

Example embodiments provide for a number of benefits. For instance, some POIs (e.g., landmarks) may not have a postal address, but can still be used to describe a very specific geographic location. In this case, a POI for such a landmark without a postal address, may be a better reverse geocoding in an area with no addresses. In another example, a particular POI might help identify an exact location in a larger venue, for example all stores in a mall might have the same address but may be located on opposite side of a large parking lot. Moreover in the context of personal transport and ridesharing, showing POIs or landmarks to the driver enables the driver to easily locate the rider during the pickup as the POIs are more easily visible from the street compared to the corresponding addresses/street numbers. Also, in some international markets, some of the businesses may not even have a formal street address associated with them. Thus, using the POIs/business names as reverse geocoding strings is critical to ease rider/driver rendezvous.

The following examples describe various embodiments of methods, machine-readable media, and systems (e.g., machines, devices, or other apparatus) discussed herein.

Example 1

A computer-implemented method comprising:
receiving, by a server system, geographic coordinates for a location;
generating, by the server system, a plurality of candidate places located within a predetermined distance from the location based on the geographic coordinates of the location;
extracting, by the server system, a plurality of features for each candidate place of the plurality of candidate places;
generating, by the server system, a place score for each candidate place of the plurality of candidate places using the plurality of features for each candidate place of the plurality of candidate places;
determining, by the server computer, a best candidate place based on the place score for each candidate place of the plurality of candidate places; and
providing, by the server system, a place name associated with the best candidate place.

Example 2

A method according to example 1, wherein the geographic coordinates comprise a latitude and a longitude associated with the location.

Example 3

A method according to any of the previous examples, wherein the geographic coordinates for the location are received as part of a request for reverse geocoding for the location.

Example 4

A method according to any of the previous examples, wherein generating a plurality of candidate places located within a predetermined distance from the location comprises performing a spatial query on one or more databases to retrieve data for each of the plurality of candidates.

Example 5

A method according to any of the previous examples, wherein the plurality of features comprise at least one of the following features: a distance between the candidate place and the location, whether a candidate place has been verified, a candidate place popularity, a visibility of the candidate place, whether the candidate place and location are in the same parcel, whether the candidate place and location are in the same city block, whether the candidate place and location are in the same building, a number of candidate places in the predetermined distance from the location, and what type of candidate places are in the predetermined distance from the location.

Example 6

A method according to any of the previous examples, wherein each candidate place is associated with a place type, wherein the place type is address, indicating the candidate place is an address string, or point of interest, indicating that the candidate place is a point of interest.

Example 7

A method according to any of the previous examples, wherein a candidate place is discarded if the candidate place is not in a same parcel or block as the location, unless the candidate place is less than a second predetermined distance from the location and is of type address, or the candidate place is less than a second predetermined distance from the location and is of type point of interest and there are no other points of interest within a third predetermined distance from the location.

Example 8

A method according to any of the previous examples, wherein a candidate place is discarded if the candidate place is in the same block but not in the same parcel, unless the candidate place is less than a second predetermined distance from the location and is of type address or if the candidate place is less than the second predetermined distance from the location and is of type point of interest and there are no other points of interest within a third predetermined distance from the location.

Example 9

A method according to any of the previous examples, where a candidate place is discarded if the candidate place is in the same parcel, unless the candidate place is less than a second predetermined distance from the location and is of type address, or if the candidate place is less than a second predetermined distance and it is of type point of interest and there are no other points of interest within a third predetermined distance from the location.

Example 10

A method according to any of the previous examples, wherein a candidate place is discarded if the candidate place has not been verified.

Example 11

A system comprising:
a memory that stores instructions; and
one or more processors configured by the instructions to perform operations comprising:
receiving geographic coordinates for a location;
generating a plurality of candidate places located within a predetermined distance from the location based on the geographic coordinates of the location;
extracting a plurality of features for each candidate place of the plurality of candidate places;
generating a place score for each candidate place of the plurality of candidate places using the plurality of features for each candidate place of the plurality of candidate places;
determining a best candidate place based on the place score for each candidate place of the plurality of candidate places; and
providing a place name associated with the best candidate place.

Example 12

A system according to any of the previous examples, wherein the geographic coordinates comprise a latitude and a longitude associated with the location.

Example 13

A system according to any of the previous examples, wherein the geographic coordinates for the location are received as part of a request for reverse geocoding for the location.

Example 14

A system according to any of the previous examples, wherein generating a plurality of candidate places located within a predetermined distance from the location comprises performing a spatial query on one or more databases to retrieve data for each of the plurality of candidates.

Example 15

A system according to any of the previous examples, wherein the plurality of features comprise at least one of the following features: a distance between the candidate place and the location, whether a candidate place has been verified, a candidate place popularity, a visibility of the candidate place, whether the candidate place and location are in the same parcel, whether the candidate place and location are in the same city block, whether the candidate place and location are in the same building, a number of candidate places in the predetermined distance from the location, and what type of candidate places are in the predetermined distance from the location.

Example 16

A system according to any of the previous examples, wherein each candidate place is associated with a place type, wherein the place type is address, indicating the candidate place is an address string, or point of interest, indicating that the candidate place is a point of interest.

Example 17

A system according to any of the previous examples, wherein a candidate place is discarded if the candidate place is not in a same parcel or block as the location, unless the candidate place is less than a second predetermined distance from the location and is of type address, or the candidate place is less than a second predetermined distance from the location and is of type point of interest and there are no other points of interest within a third predetermined distance from the location.

Example 18

A system according to any of the previous examples, wherein a candidate place is discarded if the candidate place is in the same block but not in the same parcel, unless the candidate place is less than a second predetermined distance from the location and is of type address or if the candidate place is less than the second predetermined distance from the location and is of type point of interest and there are no other points of interest within a third predetermined distance from the location.

Example 19

A system according to any of the previous examples, where a candidate place is discarded if the candidate place is in the same parcel, unless the candidate place is less than a second predetermined distance from the location and is of type address, or if the candidate place is less than a second predetermined distance and is of type point of interest and there are no other points of interest within a third predetermined distance from the location.

Example 20

A non-transitory machine-readable medium comprising instructions stored thereon that are executable by at least one processor to cause a computing device to perform operations comprising:

receiving geographic coordinates for a location;

generating a plurality of candidate places located within a predetermined distance from the location based on the geographic coordinates of the location;

extracting a plurality of features for each candidate place of the plurality of candidate places;

generating a place score for each candidate place of the plurality of candidate places using the plurality of features for each candidate place of the plurality of candidate places;

determining a best candidate place based on the place score for each candidate place of the plurality of candidate places; and providing a place name associated with the best candidate place.

Figure 7:
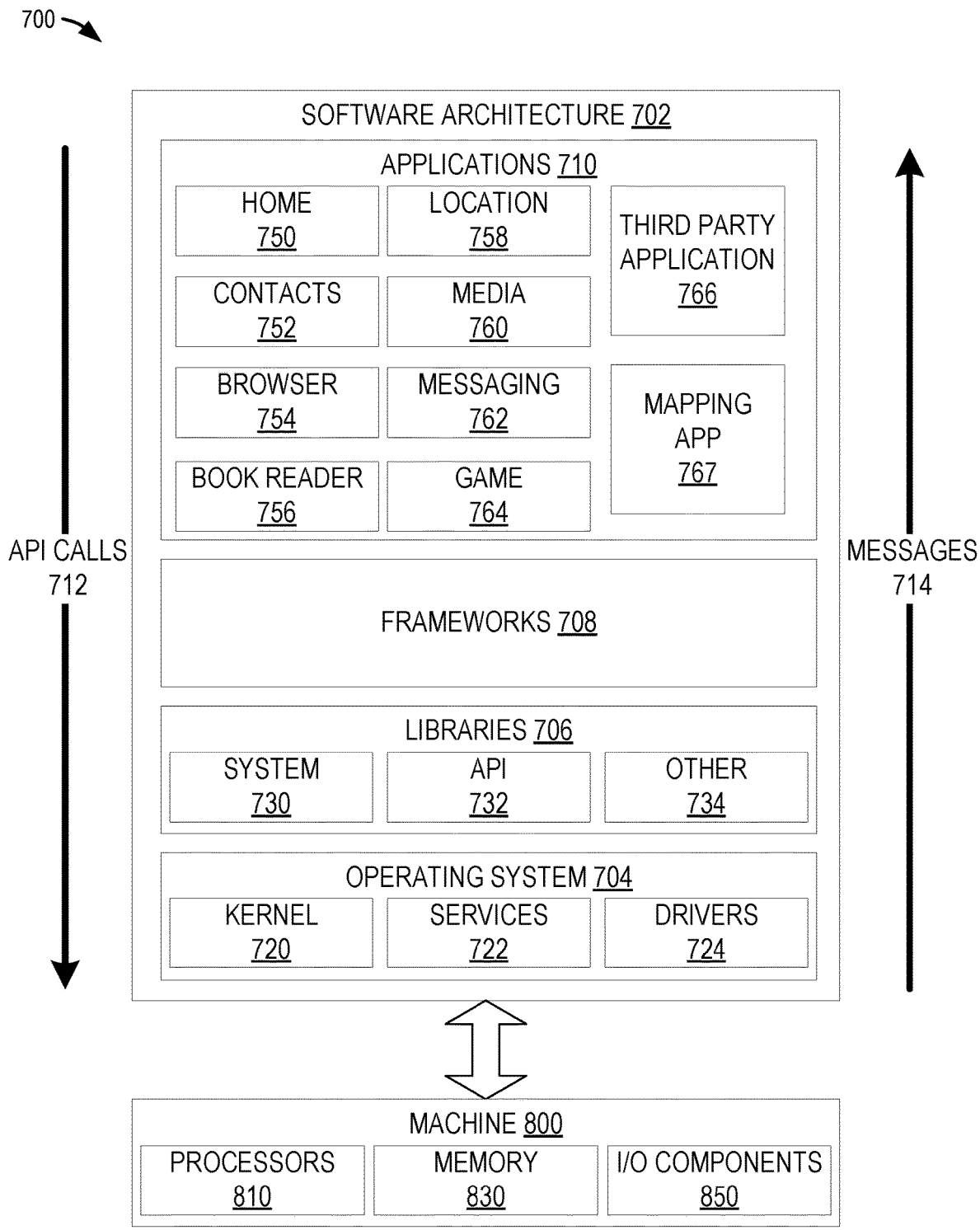
FIG. 7 is a block diagram illustrating an example of a software architecture that may be installed on a machine, according to some example embodiments.

FIG. 7 is a block diagram 700 illustrating software architecture 702, which can be installed on any one or more of the devices described above. For example, in various embodiments, client devices 110 and servers and systems 130, 102, 120, 122, and 124 may be implemented using some or all of the elements of software architecture 702. FIG. 7 is merely a non-limiting example of a software architecture, and it will be appreciated that many other architectures can be implemented to facilitate the functionality described herein. In various embodiments, the software architecture 702 is implemented by hardware such as machine 800 of FIG. 8 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Some embodiments may particularly include a mapping application 767. In certain embodiments, this may be a stand-alone application that operates to manage communications with a server system such as third-party servers 130 or server system 102. In other embodiments, this functionality may be integrated with another application. The mapping application 767 may request and display various data related to mapping and navigation, and may provide the capability for a user 106 to input data related to the objects via a touch interface, keyboard, or using a camera device of machine 800, communication with a server system via I/O components 850, and receipt and storage of object data in memory 830. Presentation of information and user inputs associated with the information may be managed by mapping application 767 using different frameworks 708, library 706 elements, or operating system 704 elements operating on a machine 800.

Figure 8:
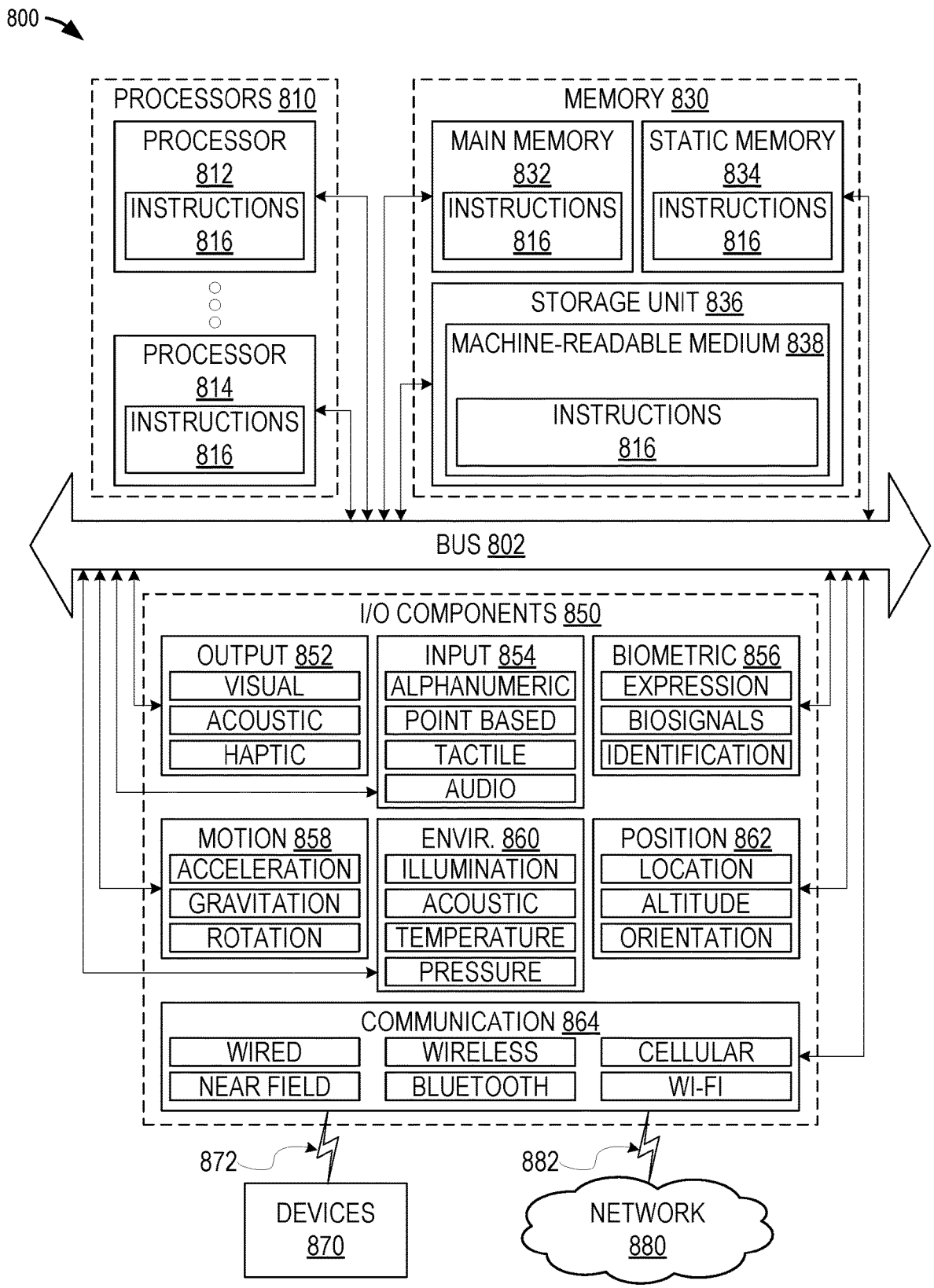
FIG. 8 illustrates a diagrammatic representation of a machine, in the form of a computer system, within which a set of instructions may be executed for causing the machine to perform any one or more of the methodologies discussed herein, according to an example embodiment.

FIG. 8 is a block diagram illustrating components of a machine 800, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine or system 130, 102, 120, 122, 124, etc., or a client device 110 in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute instructions 816 contemporaneously. Although FIG. 8 shows multiple processors 810, the machine 800 may include a single processor 810 with a single core, a single processor 810 with multiple cores (e.g., a multi-core processor 810), multiple processors 812, 814 with a single core, multiple processors 812, 814 with multiples cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, communication components 864 include wired communication components, wireless communication components, cellular communication components, near field communication (NFC) components, BLUETOOTH® components (e.g., BLUETOOTH® Low Energy), WI-FT® components, and other communication components to provide communication via other modalities. The devices 870 may be another machine 800 or any of a wide variety of peripheral devices (e.g., a peripheral device coupled via a Universal Serial Bus (USB)).

Moreover, in some embodiments, the communication components 864 detect identifiers or include components operable to detect identifiers. For example, the communication components 864 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 864, such as location via Internet Protocol (IP) geo-location, location via WI-FT® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 816 are transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 "non-transitory" should not be construed to mean that the medium is incapable of movement; the medium 838 should be considered as being transportable from one physical location to another. Additionally, since the machine-readable medium 838 is tangible, the medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   receiving, by a server system from a mobile device, geographic coordinates for a location corresponding to the mobile device;
   generating, by the server system, a plurality of candidate places located within a predetermined distance from the location based on the geographic coordinates of the location;
   extracting, by the server system, a plurality of features for each candidate place of the plurality of candidate places, the plurality of features comprising at least a distance between each candidate place and the location and visibility information of each candidate place, the visibility information indicating visibility of a candidate place by a user of the mobile device;
   generating, by the server system, a place score for each candidate place of the plurality of candidate places using the plurality of features for each candidate place of the plurality of candidate places by performing operations comprising:
      generating a distance score for the candidate place based on the distance between the candidate place and the location;
      generating a visibility score for the candidate place based on the visibility information of the candidate place, the visibility score indicating at least whether the candidate place is visible at a time of day corresponding to a time of day the geographic coordinates are received for the location; and
      calculating the place score based on the distance score and the visibility score;
   determining, by the server system, a best candidate place based on the place score for each candidate place of the plurality of candidate places; and
   providing, by the server computer, a place name associated with the best candidate place.

2. The method of claim 1, wherein the geographic coordinates comprise a latitude and a longitude associated with the location.

3. The method of claim 1, wherein the geographic coordinates for the location are received as part of a request for reverse geocoding for the location.

4. The method of claim 1, wherein generating a plurality of candidate places located within a predetermined distance from the location comprises performing a spatial query on one or more databases to retrieve data for each of the plurality of candidates.

5. The method of claim 1, wherein the plurality of features further comprise at least one of the following features: whether a candidate place has been verified, a candidate place popularity, whether the candidate place and location are in the same parcel, whether the candidate place and location are in the same city block, whether the candidate place and location are in the same building, a number of candidate places in the predetermined distance from the location, and what type of candidate places are in the predetermined distance from the location.

6. The method of claim 1, wherein each candidate place is associated with a place type, wherein the place type is address, indicating the candidate place is an address string, or point of interest, indicating that the candidate place is a point of interest.

7. The method of claim 6, further comprising:
   determining that a candidate place is not in a same parcel or block as the location; and
   discarding the candidate place unless the candidate place is less than a second predetermined distance from the location and is of type address, or unless the candidate place is less than a second predetermined distance from the location and is of type point of interest and there are no other points of interest within a third predetermined distance from the location.

8. The method of claim 6, further comprising:
   determining that a candidate place is in the same block but not in the same parcel as the location; and
   discarding the candidate place unless the candidate place is less than a second predetermined distance from the location and is of type address or unless the candidate place is less than the second predetermined distance from the location and is of type point of interest and there are no other points of interest within a third predetermined distance from the location.

9. The method of claim 6, further comprising:
   determining that a candidate place is in the same parcel as the location; and
   discarding the candidate place unless the candidate place is less than a second predetermined distance from the location and is of type address, or unless the candidate place is less than a second predetermined distance and it is of type point of interest and there are no other points of interest within a third predetermined distance from the location.

10. The method of claim 6, wherein a candidate place is discarded if the candidate place has not been verified.

11. The method of claim 1, wherein the feature comprising the visibility information of the candidate place comprises from what direction the candidate place is visible, whether the candidate place is visible during the night, and whether the candidate place is visible during the day.

12. The method of claim 1, further comprising:
   generating a base score indicating whether the place is in the same building, parcel, or block as the location; and calculating the place score by adding the base score to the distance score and visibility score.

13. The method of claim 12, wherein the base score is a predetermined score comprising a first value upon determining that the place is in the same building, a second value upon determining the place is in the same parcel, and a third value upon determining that the place is in the same block.

14. A system comprising:
a memory that stores instructions; and
one or more processors configured by the instructions to perform operations comprising:
receiving, from a mobile device, geographic coordinates for a location corresponding to the mobile device;
generating a plurality of candidate places located within a predetermined distance from the location based on the geographic coordinates of the location;
extracting a plurality of features for each candidate place of the plurality of candidate places, the plurality of features comprising at least a distance between each candidate place and the location and visibility information of each candidate place, the visibility information indicating visibility of a candidate place by a user of the mobile device;
generating a place score for each candidate place of the plurality of candidate places using the plurality of features for each candidate place of the plurality of candidate places by performing operations comprising:
generating a distance score for the candidate place based on the distance between the candidate place and the location:
generating a visibility score for the candidate place based on the visibility information of the candidate place, the visibility score indicating at least whether the candidate place is visible at a time of day corresponding to a time of day the geographic coordinates are received for the location; and
calculating the place score based on the distance score and the visibility score;
determining a best candidate place based on the place score for each candidate place of the plurality of candidate places; and
providing a place name associated with the best candidate place.

15. The system of claim 14, wherein the plurality of features further comprise at least one of the following features: whether a candidate place has been verified, a candidate place popularity, whether the candidate place and location are in the same parcel, whether the candidate place and location are in the same city block, whether the candidate place and location are in the same building, a number of candidate places in the predetermined distance from the location, and what type of candidate places are in the predetermined distance from the location.

16. The system of claim 14, wherein each candidate place is associated with a place type, wherein the place type is address, indicating the candidate place is an address string, or point of interest, indicating that the candidate place is a point of interest.

17. The system of claim 16, further comprising:
determining that a candidate place is not in a same parcel or block as the location; and
discarding the candidate place unless the candidate place is less than a second predetermined distance from the location and is of type address, or unless the candidate place is less than a second predetermined distance from the location and is of type point of interest and there are no other points of interest within a third predetermined distance from the location.

18. The system of claim 16, further comprising:
determining that a candidate place is in the same block but not in the same parcel as the location; and
discarding the candidate place unless the candidate place is less than a second predetermined distance from the location and is of type address or unless the candidate place is less than the second predetermined distance from the location and is of type point of interest and there are no other points of interest within a third predetermined distance from the location.

19. The system of claim 16, further comprising:
determining that a candidate place is in the same parcel as the location; and
discarding the candidate place unless the candidate place is less than a second predetermined distance from the location and is of type address, or unless the candidate place is less than a second predetermined distance and it is of type point of interest and there are no other points of interest within a third predetermined distance from the location.

20. A non-transitory machine-readable medium comprising instructions stored thereon that are executable by at least one processor to cause a computing device to perform operations comprising:
receiving, from a mobile device, geographic coordinates for a location corresponding to the mobile device;
generating a plurality of candidate places located within a predetermined distance from the location based on the geographic coordinates of the location;
extracting a plurality of features for each candidate place of the plurality of candidate places, the plurality of features comprising at least a distance between each candidate place and the location and visibility information of each candidate place, the visibility information indicating visibility of a candidate place by a user of the mobile device;
generating a place score for each candidate place of the plurality of candidate places using the plurality of features for each candidate place of the plurality of candidate places by performing operations comprising:
generating a distance score for the candidate place based on the distance between the candidate place and the location:
generating a visibility score for the candidate place based on the visibility information of the candidate place, the visibility score indicating at least whether the candidate place is visible at a time of day corresponding to a time of day the geographic coordinates are received for the location; and
calculating the place score based on the distance score and the visibility score;
determining a best candidate place based on the place score for each candidate place of the plurality of candidate places; and
providing a place name associated with the best candidate place.

* * * * *